(12) United States Patent
Sethi et al.

(10) Patent No.: US 11,075,771 B2
(45) Date of Patent: Jul. 27, 2021

(54) METHOD FOR GENERATING OPERATING ENTROPY

(71) Applicant: Telefonaktiebolaget LM Ericsson (publ), Stockholm (SE)

(72) Inventors: Mohit Sethi, Helsinki (FI); Nicklas Beijar, Kirkkonummi (FI); Kristian Slavov, Espoo (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 107 days.

(21) Appl. No.: 16/617,547

(22) PCT Filed: Jun. 22, 2017

(86) PCT No.: PCT/EP2017/065374
§ 371 (c)(1),
(2) Date: Nov. 27, 2019

(87) PCT Pub. No.: WO2018/233829
PCT Pub. Date: Dec. 27, 2018

(65) Prior Publication Data
US 2020/0145236 A1    May 7, 2020

(51) Int. Cl.
*H04L 29/06* (2006.01)
*H04L 9/32* (2006.01)
(Continued)

(52) U.S. Cl.
CPC ............ *H04L 9/3297* (2013.01); *G06F 7/588* (2013.01); *H04L 9/0662* (2013.01); *H04L 9/0869* (2013.01); *H04L 9/3247* (2013.01)

(58) Field of Classification Search
None
See application file for complete search history.

(56) References Cited

U.S. PATENT DOCUMENTS 10,454,674 B1 * 10/2019 Bar-El .................. H04L 9/0637
2014/0244785 A1 * 8/2014 Potlapally ............. H04L 9/0869
                                                                    709/217
(Continued)

OTHER PUBLICATIONS

Kline, Jeff et al. Traffic Anomaly Detection at Fine Time Scales with Bayes Nets. 2008 The Third International Conference on Internet Monitoring and Protection. https://ieeexplore.ieee.org/stamp/stamp.jsp?tp=&arnumber=4561324 (Year: 2008).*

(Continued)

*Primary Examiner* — Jeremiah L Avery
(74) *Attorney, Agent, or Firm* — Murphy, Bilak & Homiller, PLLC (57) ABSTRACT

A method (10) for generating operating entropy is provided. The method (10) is performed by a cloud computing entity (2) run on shared underlying resources (3). The method (10) comprises: sending (11) a respective entropy request to one or more servers (5a, 5b, 5c), inserting in each entropy request a respective timestamp, receiving (12) a response from each of the one or more servers (5a, 5b, 5c), each response payload comprising random bytes of unknown amount of entropy, verifying (13) validity of each response by comparing the respective timestamp in each response to a corresponding stored timestamp, and generating (14) the operating entropy based on at least one of the received responses. A cloud computing entity (2), a computer program and a computer program product are also provided.

11 Claims, 3 Drawing Sheets

(51) Int. Cl.
*G06F 7/58* (2006.01)
*H04L 9/06* (2006.01)
*H04L 9/08* (2006.01)

(56) References Cited

U.S. PATENT DOCUMENTS

| | | |
|---|---|---|
| 2015/0058841 A1 | 2/2015 | Krempa et al. |
| 2015/0082399 A1* | 3/2015 | Wu ........................ H04L 9/0897 726/6 |
| 2015/0121066 A1* | 4/2015 | Nix ......................... H04W 4/70 713/155 |
| 2015/0277856 A1 | 10/2015 | Payne et al. |
| 2015/0312233 A1* | 10/2015 | Graham, III ............ H04L 63/08 713/171 |
| 2016/0218875 A1* | 7/2016 | Le Saint ............. H04L 63/0435 |
| 2016/0337346 A1* | 11/2016 | Momchilov ........ H04L 63/0272 |

OTHER PUBLICATIONS

Barnes, R.N. et al. Spectral analysis of timestamp data on unsynchronized computer systems. Proceedings of the 33rd Southeastern Symposium on System Theory (Cat. No.01EX460). https://ieeexplore.ieee.org/stamp/stamp.jsp?tp=&arnumber=918536 (Year: 2001).*

* cited by examiner

METHOD FOR GENERATING OPERATING ENTROPY

TECHNICAL FIELD

The technology disclosed herein relates generally to the field of computer security, and in particular to a method for generating operating entropy, a cloud computing entity, computer program and computer program product.

BACKGROUND

Randomness is required for all network security protocols. Randomness is, for instance, required for generating public-private key pairs, nonces (arbitrary numbers used once) or for random numbers used as input to various key derivation functions. Randomness is often also required for other (non-security) network protocols. For example, even a simple Transmission Control Protocol (TCP) connection requires a random initial sequence number.

Deterministic machines, such as computer programs, cannot produce real randomness by themselves. Instead they rely on various random number generating algorithms. Since the algorithms are deterministic as well, they are not able to generate randomness, rather "pseudo-randomness", i.e. number that look random but are predictable based on the previous history. However, if the algorithms are provided true random input, so will the output be (with certain limitations and assumptions on the algorithm).

Entropy is a measure of the number of truly random bits outputted by these algorithms. Ideally there should be 1 bit of entropy for each random bit generated by the algorithm. This corresponds to a situation where each generated bit is equally possible, i.e. could be either 1 or 0 with 50% probability. Otherwise this bit has an entropy of less than one. Given the previously generated bits, it must not be possible to predict the following bit.

Some operating systems report the amount of entropy they have, meaning the number of totally random bits they can produce.

It is critical to ensure sufficient amount of entropy, otherwise various vulnerabilities may arise. For example, it has been noted that several Transport Layer Security (TLS) certificates share the same keys due to insufficient entropy during key generation. It was further found that it was possible to obtain Rivest-Shamir-Adleman cryptosystem (RSA) private keys for various TLS and secure shell (SSH) hosts, because the public keys shared nontrivial common factors due to entropy problems. Similarly, weakness in the randomness of two out of every one thousand RSA moduli has been demonstrated.

On a typical (Linux) personal computer (PC) device, such as, for instance, a laptop or smartphone, various inputs may be used for generating randomness, examples of which comprise:

1. Hardware random number generator (RNG): A hardware random number generator generates random numbers from a physical process. They typically generate low-level random noise from sources such as thermal noise, photoelectric effect and other quantum phenomena.
2. Keyboard: Keystrokes made by the user.
3. Mouse: Movements of the mouse.
4. Disk input/output (I/O) and rotation: The disk read/write pattern and rotation pattern based on the user.

The Linux kernel has a special device providing randomness to the applications. Reading random numbers from this device will block indefinitely until the kernel has enough randomness to share.

While the above sources often provide enough entropy on separate physical machines, generating sufficient quality of entropy in virtualized environments is very challenging. First, most virtual machines (or containers) are headless devices having no access to a mouse or keyboard as sources of entropy. Moreover, the machines on which virtual machines (or containers) run often do not have a mouse or keyboard attached or the use of mouse and keyboard is minimal because of low amount of human interaction when the server is part of a data center.

Next, in a virtualized environment, several virtual machines run on the same shared underlying resources, such as hypervisor and hardware. It is possible that the virtual machines running on the same hypervisor and underlying hardware belong to different organizational entities and that some of them are owned and operated by malicious entities. Since the amount of available entropy is limited, an attacker may deplete all of the available entropy on a given hypervisor/hardware. The attacker may also affect disk read/write/rotation patterns of the underlying hardware from the virtual machines in its control.

Furthermore, many of the traditional hard disks are being replaced by solid-state disks (SSDs) that do not allow the same mechanisms for entropy generation to be used as for rotational disks.

Various traditional sources of entropy used by a hardware random number generator (RNG) are also of little use. For example, the temperature or lighting in a data center is controlled and rarely varies significantly enough to generate high quality of entropy for virtual machines running on a shared hypervisor/hardware.

A current solution is to use userspace software only solutions for generating entropy. For instance, randomness may be generated based on variations in code execution time on a processor. Thus, even if the executed processes are deterministic, the execution order of code belonging to these processes may to some degree be random. However, the security of such software sources of entropy still remains questionable and, moreover, in a virtualized environment the hardware is shared among many different virtual machines that may cause them to generate the same entropy and thus the same resultant cryptographic keys. Also, software entropy sources are considerably slower than typical hardware RNGs. This can cause certain applications to slow down while they wait for enough entropy in the buffer. Further, such software tools depend on instructions that may not be enabled in a virtualized environment for security reasons. It is, for example, not always possible to rely on a "Time Stamp Counter" instruction (e.g. rdtsc instruction) for counting the number of cycles since last reset, since such instructions may be disabled on some systems in order to mitigate certain types of attacks (e.g. cache timing attacks from unprivileged mode).

While it may be tempting to obtain entropy from a secure trusted third party, implementing such a service is non-trivial because such entropy information would have to be sent over a secure channel. Most secure channels (such as TLS) require some initial entropy themselves for generating keys and nonces. Receiving entropy from a trusted online service thus typically runs into the "chicken-and-egg" problem. To be able to securely communicate with an online trusted entropy service to obtain entropy, a virtual machine needs to have some operating entropy to generate keys (for a public-private key pair which would be used for TLS). However, a virtual machine that has just been spawned does not have any source of randomness. Therefore, the first communication is either unencrypted or encrypted with a very weak key that may be possible for other (possibly malicious) virtual machines to know.

There are services that provide true random numbers to anyone on the Internet. Such a service is, for instance, used for holding drawings, lotteries and sweepstakes, to drive online games, for scientific applications and for art and music. These services are primarily meant for users to obtain a one time random number over a secure TLS connection. These services also assume that the requesting client has enough entropy for creating a secure connection, which, as mentioned, e.g. newly spawned virtual machines do not have.

The virtual machine may typically have a few bits of entropy available but not sufficient entropy for key generation.

SUMMARY

An objective of the present disclosure is to address and improve various aspects for entropy generation. A particular objective is to enable operating entropy generation for entities lacking sources of randomness. Another particular objective is to enable use of unreliable network resources for generating entropy. These objectives and others are achieved by the methods, devices, computer programs and computer program products according to the appended independent claims, and by the embodiments according to the dependent claims.

The objective is according to an aspect achieved by a method of generating operating entropy. The method is performed by a cloud computing entity run on shared underlying resources, e.g. a hypervisor. The method comprises sending a respective entropy request to one or more servers, inserting in each entropy request a respective timestamp, receiving a response from each of the one or more servers, each response payload comprising random bytes of unknown amount of entropy, verifying validity of each response by comparing the respective timestamp in each response to a corresponding stored timestamp, and generating the operating entropy based on at least one of the received responses.

The method provides a number of advantages. For instance, by means of the method a cloud computing entity such as a virtual machine is enabled to obtain entropy for an initial secure communication. The entropy obtained by the cloud computing entity is not known to any of the entropy servers used, hence making e.g. cryptographic keys generated based on the entropy difficult—if not impossible—for an attacker to break. Further, the cloud computing entity is not completely dependent on its underlying resources, e.g. hypervisor, for entropy generation. This provides a high level of security even when several cloud computing entities (e.g. several virtual machines) are run on the same underlying resources, e.g. same hypervisor and hardware. Still further, it is difficult or impossible for eavesdroppers to observe the resulting random data. The method is resilient to the case where some fraction of entropy servers does not provide reliable replies (e.g. replies without true randomness).

The objective is according to an aspect achieved by a computer program for a cloud computing entity. The computer program comprises computer program code, which, when run on at processing circuitry of the cloud computing entity causes the cloud computing entity to perform the method according to the above method.

The objective is according to an aspect achieved by a computer program product comprising a computer program as above and a computer readable means on which the computer program is stored.

The objective is according to an aspect achieved by a cloud computing entity for generating operating entropy. The cloud computing entity is run on a shared underlying resources and is configured to: send a respective entropy request to one or more servers, inserting in each entropy request a respective timestamp, receive a response from each of the one or more servers, each response payload comprising random bytes of unknown amount of entropy, verify validity of each response by comparing the respective timestamp in each response to a corresponding stored timestamp, and generate the operating entropy based on at least one of the received responses.

Further features and advantages of the embodiments of the present teachings will become clear upon reading the following description and the accompanying drawings.

DETAILED DESCRIPTION

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

Briefly, the present teachings is targeted at various aspects of improving the initial entropy for devices and entities that do not have sources of entropy or do not have enough entropy e.g. for creating a secure connection. Such devices/entities are exemplified by cloud computing entities herein. A particular example of such entity is a newly spawned virtual machine, another is a swarm of containers spawned under very short period of time, e.g. a webservice scale up event during peak hours. The provided solution allows e.g. a virtual machine to obtain a first operating entropy, which may later be used to, for instance, generate any encryption keys needed for obtaining the actual entropy. In some embodiments, the (initial) operating entropy may be provided as an online Internet-scale service.

As a note on terminology, "initial entropy" as used herein refers to, for the case of a virtual machine, the entropy that an operative system (OS) of the virtual machine has or the entropy that a hypervisor on which the virtual machine is run has. As mentioned in the background section, this may, for instance, be a few bits of entropy, which is not sufficient entropy for key generation. The "operating entropy" that the method provided herein enables is the entropy that the cloud computing entity (e.g. the virtual machine) creates. In some embodiments of the method, "further operating entropy" is generated based at least on the "operating entropy" and preferably also on the initial entropy.

Figure 1:
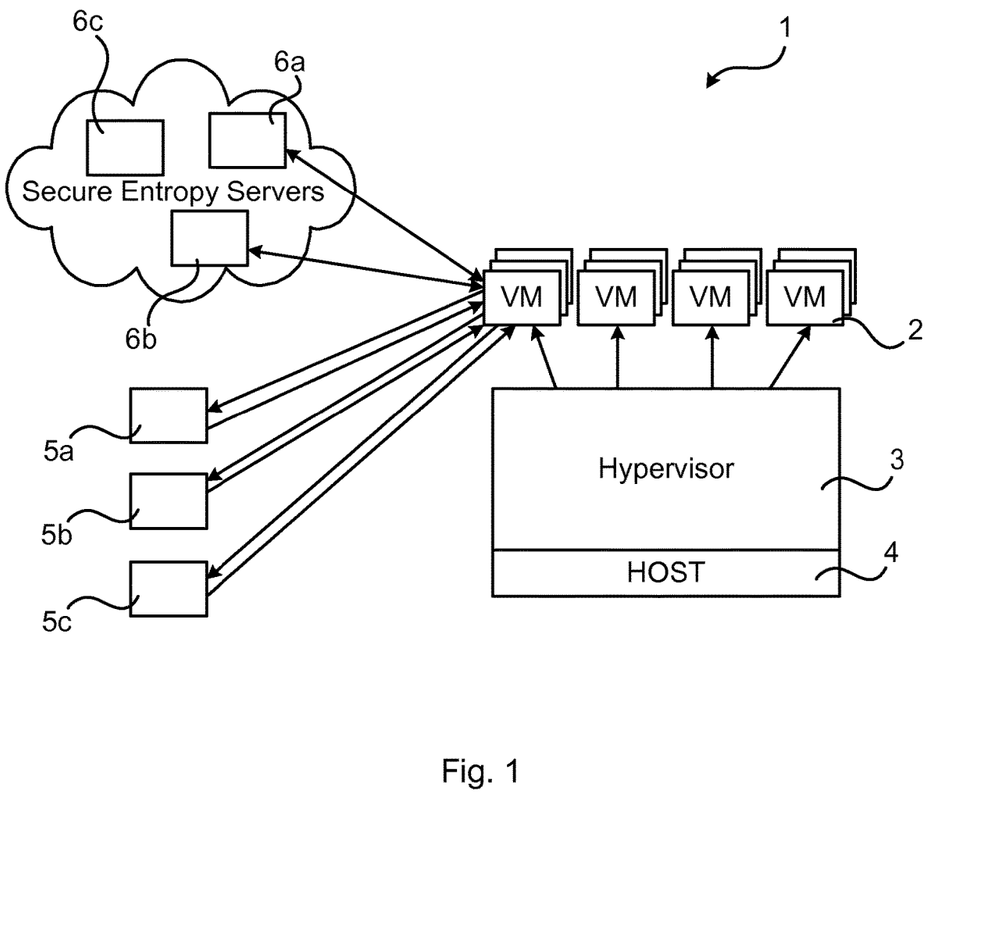
FIG. 1 illustrates an environment in which embodiments according to the present teachings may be implemented.

FIG. 1 illustrates an environment in which embodiments according to the present teachings may be implemented.

A cloud computing entity 2 is in the following exemplified by a virtual machine 2. The virtual machine 2 may be seen as an emulation of a computer system and may be implemented in specialized hardware or software or a combination thereof. The virtual machine 2 may be part of a cloud computing environment 1, which provides shared computer processing resources to various devices, e.g. computers, on demand. The computer processing resources may then be configurable computer resources, which are shared. The cloud computing resources may, for instance, comprise one or more of: core of a central processing unit (CPU core), memory, disk usage, networks, servers, storage and applications. It is noted that the teachings are applicable also to other types of virtualizations, e.g. Docker containers, which split up the operating system into virtualized compartments to run container applications.

The cloud computing entities, e.g. virtual machines 2 or containers, usually make use of different drivers, such as hypervisors 3 and virtual switches, installed on hosts 4. The hypervisor 3, sometimes denoted virtual machine monitor (VMM), is a piece of computer software, firmware or hardware that creates and runs the virtual machines 2. A virtual switch (not shown in FIG. 1) is a logical switching fabric built into a virtual machine infrastructure so that the virtual machines 2 can be networked wherever they are needed.

According to the present teachings, once the virtual machine 2 is spawned, it queries a number of servers 5a, 5b, 5c in sequence or in parallel for entropy. This communication may not be encrypted at all, or be encrypted with a predefined key, since the virtual machine 2 does not (typically) have sufficiently entropy available at this phase in order to generate unique keys. The servers 5a, 5b, 5c induce random (and unpredictable) delays before responding with small payloads containing some random bytes. The response time of different servers 5a, 5b, 5c will vary significantly for different virtual machines 2. Both the response time and the payload may act as a source of entropy data. For each query, the virtual machine 2 may thus obtain two types of random data. Once the virtual machine 2 has collected such entropy data from one or more (preferably multiple) servers 5a, 5b, 5c, possibly spread globally, it may choose to use all or some of the collected data as input to create the operating entropy bytes that may then be used for generating keys. Based on the entropy required, the virtual machine 2 can decide on the number of servers 5a, 5b, 5c to contact, and how to combine the payloads and response times to obtain the final entropy that is used to generate the keys. By combining the entropy responses from several servers 5a, 5b, 5c, the virtual machine 2 obtains sufficient entropy that can be used to generate a truly random key. Once the virtual machine 2 has generated a public/private key pair, it can use this to initiate a TLS session to any trusted entropy server 6a, 6b, 6c and receive several bytes of entropy over a secure channel. It is assumed that the location of the entropy servers 6a, 6b, 6c is known to the virtual machine 2. For instance, a server list may be part of the virtual machine 2 image or operating system distribution, which is similar to how the virtual machine 2 knows which domain name servers and which Network Time Protocol (NTP) time servers to contact.

In various embodiments, it is assumed that the virtualization platform, i.e. the hardware, hypervisor 3 and operating system, is trusted. That is, cases where the virtualization platform is compromised are then not considered. Instead, the threat actors ("attackers") that are considered are other virtual machines 2 colluding (in exhausting the virtualization platform's randomness and/or feeding system's random pool with events providing close to zero entropy), but not being able to compromise the target virtual machines 2 memory and/or interaction with the hypervisor 3 or hardware; internal/external network traffic sniffers/modifiers, untrusted entropy servers and servers not providing actual entropy.

Since there is a significant threat if an attacker can monitor and/or replace packets coming from the servers 5a, 5b, 5c, anything received from these servers 5a, 5b, 5c has to be assumed to contain zero entropy. However, if it is assumed that most servers 5a, 5b, 5c are trustworthy, the data still needs to be protected in case an online attacker modifies the data on the path to the virtual machine 2, since the virtual machine 2 lacks the entropy to create a TLS session towards all the servers 5a, 5b, 5c. Such entropy would be required to connect to all of the servers 5a, 5b, 5c that are to be used, as it is not known which servers 5a, 5b, 5c may be compromised.

In order to combat that, the virtual machine 2 marks requests sent to the servers 5a, 5b, 5c with a time stamp. The server 5a, 5b, 5b receiving such a request may encrypt or sign its response with its private key, but the response comprises at least random data and the request time stamp.

The above indicated steps of a method are described next in a bit more detail with reference to a sequence diagram of FIG. 2.

Figure 2:
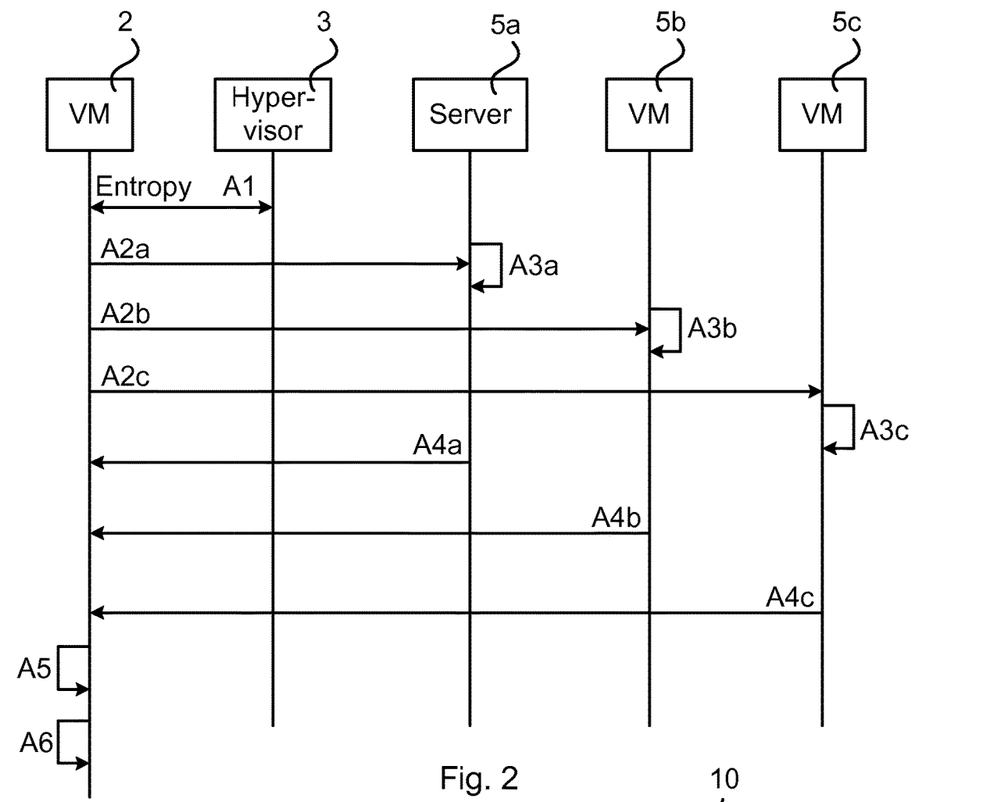
FIG. 2 is a sequence diagram illustrating generation of operating entropy according to embodiments of the present teachings.

FIG. 2 is a sequence diagram illustrating generation of operating entropy according to embodiments of the present teachings. In particular, steps for obtaining operating entropy (and further operating entropy) when a virtual machine 2 (or other cloud computing entity) is instantiated are described next:

1. The newly launched virtual machine 2 has no entropy or secure keys. It may therefore query the hypervisor 3 for some initial low-quality or low-quantity entropy (such exchange indicated at arrow A1). These bytes of entropy are not considered as safe enough or considered not to be sufficient in quantity, for being directly used for key generation and other security critical operations. These bytes of entropy may constitute the earlier defined initial entropy.

2. Next, the virtual machine 2 contacts (indicated at arrows A2a, A2b, A2c) a series of servers 5a, 5b, 5c. That is, the virtual machine 2 sends an entropy request to one or more of the servers 5a, 5b, 5c. As mentioned earlier, the location of these servers 5a, 5b, 5c is known a-priori to the virtual machine 2. For example, this information may be part of the virtual machine image. The location and the public keys of these servers 5a, 5b, 5c may also be well-known. For example, Domain Name System (DNS) and NTP have well-known global servers. The server 8.8.8.8, for example, is a well-known DNS resolver. Similarly, most Linux virtual machines have information about NTP servers from where they can obtain the current time information.

The virtual machine 2 may contact the servers 5a, 5b, 5c sequentially. For improved performance, the virtual machine contacts the servers 5a, 5b, 5c in parallel. It is noted that it is not necessary to protect this communication. In each packet the virtual machine 2 inserts a timestamp, and records the timestamp in a memory.

3. Upon receiving the entropy request the server 5a, 5b, 5c draws (arrows A3a, A3b, A3c) a predefined amount of randomness out of its pool, the source of which is unknown to the requester (i.e. to the virtual machine 2). It is noted that the entropy request does preferably not comprise the length of the requested amount of entropy. Since the virtual machine 2 cannot protect the request it would be easy for an online attacker to mangle such data field relating to length. Instead the virtual machine 2 relies on that the server 5a, 5b, 5c gives as much as possible, up to a well-defined limit (e.g. TCP Maximum Transmission Unit (MTU) that defines the size of the largest network layer protocol data unit that can be communicated in a single network transaction).

After receiving the entropy request each of the contacted servers 5a, 5b, 5c is to reply with a message comprising some entropy bytes in the payload. The entropy server 5a, 5b, 5c concatenates the random bytes with the requester's timestamp, and may, but need not, encrypt and sign this block with its private key, after which the entropy server 5a, 5b, 5c sends (arrows A4a, A4b, A4c) the response message. Effectively, anybody with the server's public key might decrypt the packet, but nobody else can create a message that can be decrypted with the public key of the server 5a, 5b, 5c. Thus, even though the data would be known to the attackers, they cannot modify it, whereby an efficient protection is provided against an attacker trying to replace packets.

4. Upon receiving a response from the entropy server(s) 5a, 5b, 5c, the virtual machine 2 may (in case of encrypted reply) decrypt the respective packets with the public key of the entropy server 5a, 5b, 5c, or verify the signature (in case of signed reply) of messages with the public key of the entropy server 5a, 5b, 5c. The virtual machine 2 verifies the timestamps of the respective packets. If the timestamp inside the received (possibly decrypted) packet is invalid, the virtual machine 2 discards the message. In some embodiments, the virtual machine 2 may then also raise an alarm alerting e.g. operators of the cloud computing environment 1 about a potential attacker. If the timestamp in the received packet is the same as the one in the original request, the received block (without the timestamp) is treated as entropy source material (in particular operating entropy source material). At arrow A5, the virtual machine 2 may thus decrypts each of the response messages, but at least establishes their validity and if valid uses them as entropy sources. It is noted that it is not necessary for the virtual machine 2 to decrypt the received responses, but only verify the signature (i.e. timestamp) thereof. It should be assumed that an attacker has the same public key available, and can decrypt also the responses. Therefore encryption is not necessary. However, the signature adds integrity protection, and is required to thwart attackers feeding pre-calculated responses.

5. Once all request responses have arrived, and possibly invalid ones have been removed from the entropy source material pool, a mangling process is performed (arrow A6):

a. Use all the randomness that can be obtained from the system (assuming more than 0 bytes and less than what would be required for a secure connection to a networked host (e.g. 64 bytes)), four random numbers are, in some embodiments, established: A, N, X and Y according to:

Let P=number of server responses with a valid message,

$0<=A<P$, is the starting index (uses at most $\log 2(P)+1$ bits of entropy),     $(d-1)*P<=N<d*P$, is the number of hashing rounds (uses at most $\log 2(P)+1$ bits of entry),     d=difficulty factor (preset, maybe known, no entropy),     $0<=Y<P$, is used to mix the hash output for determining the next response to be processed (uses at most $\log 2(P)+1$ bits of entropy),     $X>0$, is used to mix the hash with random data (using the rest of available entropy),     $H(x)$=SHA-512 (or similar function),     b. Repeat N times:

(For the first time some variables are initialized: index I=A, hash result H=0 i. Get the $I^{th}$ response, add X, add R (only after the first round), hash the result, and save it as the new R:

$$R=H(\text{response}[I]+X+R)$$

ii. Using the R, add Y, take a modulo P, set the result as I:

I=(R+Y) % P, where % is the modulo operation

After completing this process, the virtual machine 2 shall have enough (amount depends on the hash function) entropy (in particular operating entropy) to safely create a public private key pair and create secure connection to (secure) entropy servers 6a, 6b, 6c in order to obtain further operating entropy. The idea here is similar to combine entropy from multiple network sources. However, now the payload returned from the entropy servers 6a, 6b, 6c can be protected and may therefore be used more reliably to generate further entropy as needed. The entropy received from such online sources will be mixed amongst each other and with the minimal entropy that the hypervisor 3 provides. This entropy is the earlier defined "further operating entropy".

Figure 3:
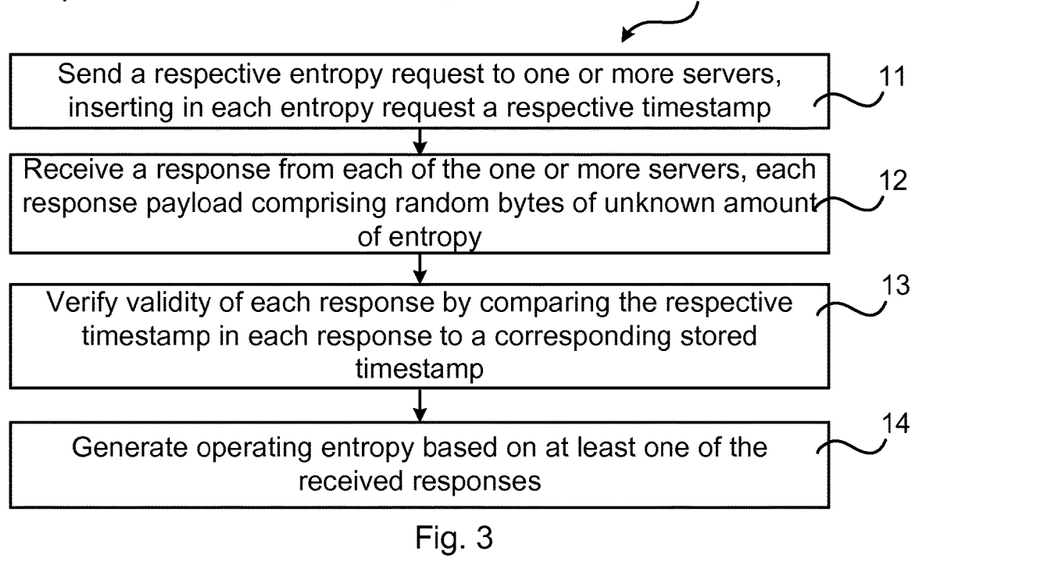
FIG. 3 illustrates a flow chart over steps of an embodiment of a method in a cloud computing entity in accordance with the present teachings.

The various embodiments and features thereof that have been described may be combined in many different ways, examples of which are given next with reference first to FIG. 3.

FIG. 3 illustrates a flow chart over steps of an embodiment of a method in a cloud computing entity in accordance with the present teachings. The method to for generating operating entropy may be performed by a cloud computing entity 2 run on shared underlying resources, such as for instance a hypervisor 3 and/or other resources. The cloud computing entity 2 may, as has been noted, be a virtual machine.

The method 10 comprises sending 11 a respective entropy request to one or more servers 5a, 5b, 5c, inserting in each entropy request a respective timestamp. The method 10 does not need to rely on any hardware root of trust devices, such as trusted platform modules. As described earlier, the cloud computing entity 2 first simply queries the shared underlying resources, e.g. the hypervisor for some initial low-quality entropy. These bytes of entropy are considered as not safe enough (or not to be sufficient in quantity) to directly use for key generation and other security critical operations.

The method 10 comprises receiving 12 a response from each of the one or more servers 5a, 5b, 5c, each response payload comprising random bytes of unknown amount of entropy. The response is not encrypted, nor is it time stamped. The response comprises two values: "next available random value" and the timestamp that the servers 5a, 5b, 5c received in their respective request. The servers 5a, 5b, 5c sign their respective responses using their private keys. The responses may, for instance, be received over Hypertext Transfer Protocol (HTTP).

The method comprises verifying 13 validity of each response by comparing the respective timestamp in each response to a corresponding stored timestamp. It is noted that the entropy request does not need to comprise a public key of e.g. a trusted module. Instead, the method 10 later relies on the timestamps for use in correlating the entropy request with a response.

The method 10 comprises generating 14 the operating entropy based on at least one of the received responses.

The method 10 provides a number of advantages. For instance, by means of the method 10 a cloud computing entity, e.g. a virtual machine 2, is enabled to obtain enough entropy for a secure communication. The entropy obtained by the cloud computing entity 2 is not known to any of the servers 5a, 5b, 5c used, hence making e.g. cryptographic keys generated based on the entropy difficult—if not impossible—for an attacker to break. Further, the cloud computing entity 2 is not completely dependent on its underlying resources, e.g. on the hypervisor 3 for entropy generation. This provides a high level of security even when several virtual machines are run on shared underlying resources, e.g. the same hypervisor 3 and host 4 (same hardware). Still further, it is difficult or impossible for eavesdroppers to observe the resulting random data. The method 10 is resilient to the case where some fraction of the (entropy) servers 5a, 5b, 5c does not provide reliable replies (e.g. replies without true randomness). In preferred embodiments, the entropy request is sent to two or more servers 5a, 5b, 5c in order to further increase security of subsequent communication.

In an embodiment, the generating 14 is based on at least one of the payloads of the received responses and initial entropy obtained from the shared underlying resources e.g. the hypervisor 3 or host 4.

In some embodiments, the generating is based on the respective payloads of the one or more received responses and initial entropy obtained from the shared underlying resources, e.g. from the hypervisor 3 (denoted "hypervisor provided entropy") or from the host 4 (denoted "host provided entropy"). The initial entropy obtained from the hypervisor is typically of lower quality (e.g. due to limited amount of available entropy) and it is therefore not suitable alone for use in setting up secure communication. In other embodiments, the generating it based also on the respective response times for each of the one or more responses.

In various embodiments, the method 10 comprises storing, for each sent entropy request, the respective timestamp inserted therein.

In variations of the above embodiments, the method 10 comprises, upon receiving 12 a respective response from each of the one or more servers 5a, 5b, 5c, verifying a signature of each response using a respective public key of the servers 5a, 5b, 5c.

Typically, it must be assumed that an attacker also has access to the public key used by the servers 5a, 5b, 5c, and encryption of the responses from these servers would hence not add security as the attacker would also be able to decrypt the responses. However, the signatures in form of the pre-calculated responses, i.e. the timestamps, do indeed add integrity protection. An attacker replaying old messages as a replay to the entropy requests sent in the method 10 would hence not be successful as such messages would fail the verification.

In various embodiments, the method 10 comprises discarding decrypted packets for which the comparing reveals a difference between the timestamp in the decrypted packet and the corresponding stored timestamp. As described earlier, in such instances an alarm may be raised for alerting an operator of a possible attack occurring.

In various embodiments, the method 10 comprises creating a public-private key pair based on the generated operating entropy, setting up a secure connection to one or more entropy providing servers 6a, 6b, 6c, receiving entropy from the one or more entropy providing servers 6a, 6b, 6c over the secure connection, and generating further operating entropy based on one or more of: the received entropy from the one or more entropy providing servers 6a, 6b, 6c and initial entropy obtained from the shared underlying resources 3.

In various embodiments, the generating 14 comprises performing computationally time consuming operations for mangling of verified responses received from the one or more servers 5a, 5b, 5c and initial entropy obtained from the shared underlying resources 3.

The operating entropy may be generated based on the verified responses from the servers 5a, 5b, 5c and on a small amount of shared underlying resources provided entropy (e.g. one bit). The generation 14 may comprise performing computationally time consuming operation blocks, i.e. repeating a set of operations for a certain period of time that is deemed to be long enough for providing operating entropy sufficiently secure to be able to obtain further operating entropy that is deemed secure. An example of such operation block is to hash a response with a random value repeatedly until the result comprises N last bits all being zeros. Another particular example was given and described in relation to FIG. 2 (arrow A6).

In various embodiments, the sending 11 of the respective entropy requests are performed in parallel. In other embodiments, the sending of the entropy requests are performed sequentially, but embodiments wherein the entropy requests are sent in parallel give improved performance, e.g. in terms of security.

In various embodiments, each response from the one or more servers 5a, 5b, 5c comprises the respective time stamp concatenated with the respective entropy bytes, this concatenation being signed and/or encrypted with a respective private key of the one or more servers 5a, 5b, 5c.

Figure 4:
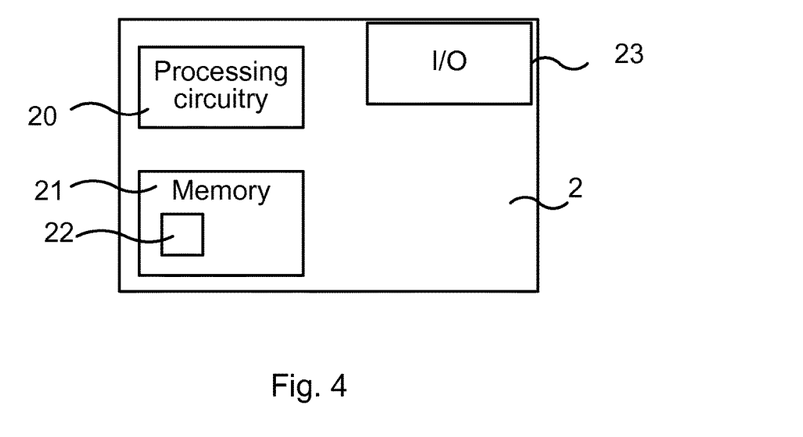
FIG. 4 illustrates schematically a cloud computing entity and means for implementing embodiments of the method in accordance with the present teachings.

FIG. 4 illustrates schematically a cloud computing entity and means for implementing embodiments of the method in accordance with the present teachings. The cloud computing entity 2 may be implemented in specialized hardware or software or a combination thereof. In some embodiments, the cloud computing entity 2 thus comprises hardware and/or software.

The cloud computing entity 2 may comprise processing circuitry 20, which may be any combination of one or more of a suitable central processing unit (CPU), multiprocessor, microcontroller, digital signal processor (DSP), etc., capable of executing software instructions stored in a computer program product 21, e.g. in the form of a storage medium 21. The processing circuitry 20 may further be provided as at least one application specific integrated circuit (ASIC), or field programmable gate array (FPGA).

The processing circuitry 20 is configured to cause the cloud computing entity 2 to perform a set of operations, or steps, e.g. as described in relation to FIG. 2 and/or FIG. 3. For example, the storage medium 21 may store the set of operations, and the processing circuitry 20 may be configured to retrieve the set of operations from the storage medium 21 to cause the cloud computing entity 2 to perform the set of operations. The set of operations may be provided as a set of executable instructions. The processing circuitry 20 is thereby arranged to execute method 10 as disclosed herein.

The storage medium 21 may also comprise persistent storage, which, for example, can be any single one or combination of magnetic memory, optical memory, solid state memory or even remotely mounted memory.

The cloud computing entity 2 may comprise input/output means 23 (denoted I/O in the figure). Such input/output means 23 may be an interface and may, for instance, comprise a protocol stack, for communication with other devices or entities. The input/output device 23 may be used for receiving data input and for outputting data.

A cloud computing entity 2 is provided for generating operating entropy. The cloud computing entity 2, e.g. a virtual machine, is run on shared underlying resources, e.g. a shared underlying resources 3. The cloud computing entity 2 is configured to:
  send a respective entropy request to one or more servers 5a, 5b, 5c, inserting in each entropy request a respective timestamp,
  receive a response from each of the one or more servers 5a, 5b, 5c, each response payload comprising random bytes of unknown amount of entropy,
  verify validity of each response by comparing the respective timestamp in each response to a corresponding stored timestamp, and
  generate the operating entropy based on at least one of the received responses.

The cloud computing entity 2 may be configured to perform the above steps e.g. by comprising processing circuitry 20 and memory 21, the memory 21 containing instructions executable by the processing circuitry 20, whereby the cloud computing entity 2 is operative to perform the steps. That is, in an embodiment, a cloud computing entity 2 is provided. The cloud computing entity 2 comprises processing circuitry 20 and memory 21, the memory 21 containing instructions executable by the processing circuitry 20, whereby the cloud computing entity 2 is operative to: send a respective entropy request to one or more servers, inserting in each entropy request a respective timestamp, receive a response from each of the one or more servers, each response payload comprising random bytes of unknown amount of entropy, verify validity of each response by comparing the respective timestamp in each response to a corresponding stored timestamp, and generate the operating entropy based on at least one of the received responses.

In an embodiment, the cloud computing entity 2 is configured to generate based on at least one of the payloads of the received responses and initial entropy obtained from the shared underlying resources, e.g. the hypervisor 3.

In various embodiments, the cloud computing entity 2 is configured to store, for each sent entropy request, the respective timestamp inserted therein.

In various embodiments, the cloud computing entity 2 is configured to, upon receiving a response from each of the one or more servers 5a, 5b, 5c, verify signature of each response by using a respective public key of the one or more servers 5a, 5b, 5c.

In various embodiments, the cloud computing entity 2 is configured to discard decrypted packets for which the comparing reveals a difference between the timestamp in the decrypted packet and the corresponding stored timestamp.

In various embodiments, the cloud computing entity 2 is configured to:
  create a public-private key pair based on the generated operating entropy,
  set up a secure connection to one or more entropy providing servers 6a, 6b, 6c,
  receive entropy from the one or more entropy providing servers 6a, 6b, 6c over the secure connection, and
  generate further operating entropy based on one or more of: the received entropy from the one or more entropy providing servers 6a, 6b, 6c and initial entropy obtained from the shared underlying resources 3.

In various embodiments, the cloud computing entity 2 is configured to generate by performing computationally time consuming operations for mangling of verified responses received from the one or more servers 5a, 5b, 5c and initial entropy obtained from the shared underlying resources 3.

In various embodiments, the cloud computing entity 2 is configured to send the respective entropy requests in parallel.

In various embodiments, each response from the one or more servers 5a, 5b, 5c comprises the respective time stamp concatenated with the respective entropy bytes, this concatenation being signed and/or encrypted with a respective private key of the one or more servers 5a, 5b, 5c.

Figure 5:
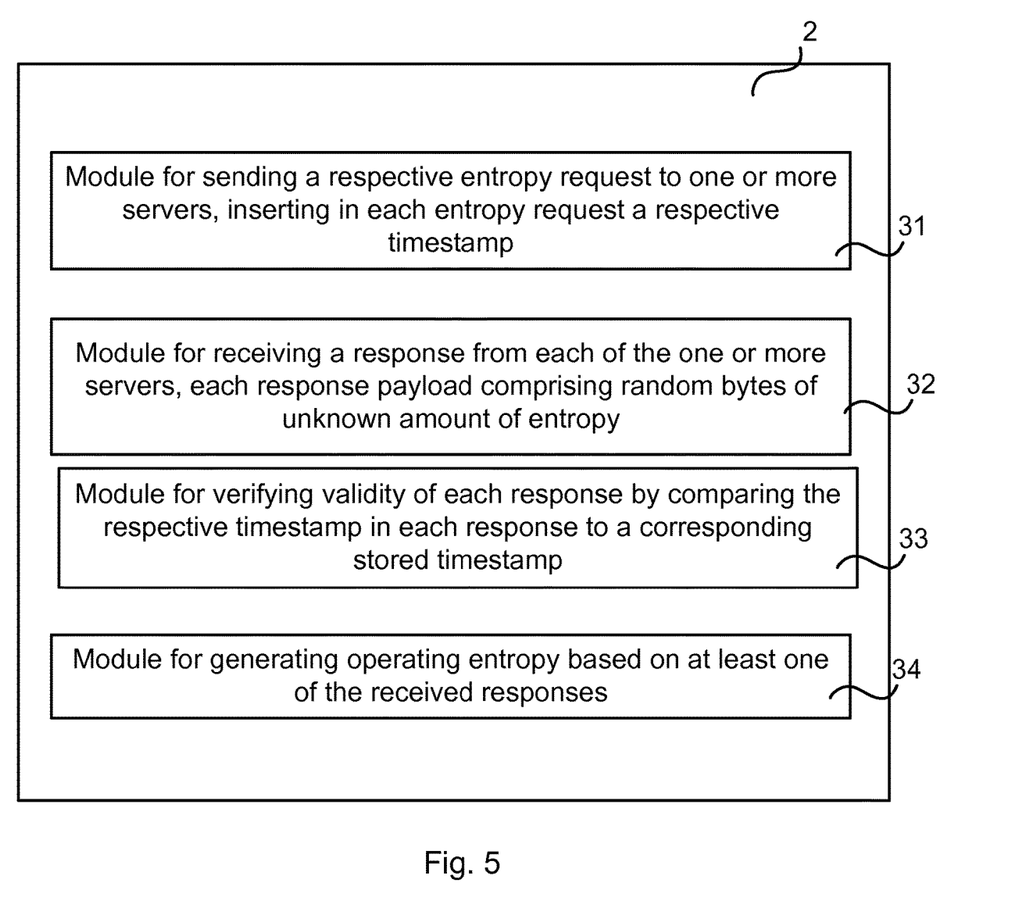
FIG. 5 illustrates a cloud computing entity comprising function modules/software modules for implementing embodiments of the present teachings.

FIG. 5 illustrates a cloud computing entity comprising function modules/software modules for implementing embodiments of the present teachings. The function modules can be implemented using software instructions such as computer program executing in a processor and/or using hardware, such as application specific integrated circuits (ASICs), field programmable gate arrays, discrete logical components etc., and any combination thereof. Processing circuitry may be provided, which may be adaptable and in particular adapted to perform any of the steps of the method to that has been described in various embodiments.

A cloud computing entity 2 is provided for generating operating entropy. The cloud computing entity comprises a first module 31 for sending a respective entropy request to one or more servers 5a, 5b, 5c, inserting in each entropy request a respective timestamp. Such first module may, for instance, comprise transmitting circuitry or an output device for sending the respective entropy requests to the servers.

The cloud computing entity comprises a second module 32 for receiving a response from each of the one or more servers 5a, 5b, 5c, each response payload comprising random bytes of unknown amount of entropy. Such second module may, for instance, comprise receiving circuitry or an input device for receiving the respective responses from the one or more servers.

The cloud computing entity comprises a third module 33 for verifying validity of each response by comparing the respective timestamp in each response to a corresponding stored timestamp. Such third module 33 may, for instance, comprise processing circuitry adapted to perform such comparison.

The cloud computing entity comprises a fourth module 34 for generating the operating entropy based on at least one of the received responses. Such fourth module 34 may, for instance, comprise processing circuitry adapted to process the received responses to obtain the desired operating entropy. The fourth module 34 may, for instance, comprise processing circuitry adapted to process operation blocks as described earlier.

It is noted that one or more modules 31, 32, 33, 34 may be replaced by units.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for generating operating entropy, the method being performed by a cloud computing entity run on shared underlying resources, the method comprising:
   sending a respective entropy request to one or more servers, inserting in each entropy request a respective timestamp;
   receiving a response from each of the one or more servers, each response payload comprising random bytes of unknown amount of entropy;
   verifying validity of each response by comparing the respective timestamp in each response to a corresponding stored timestamp; and
   generating the operating entropy based on at least one of the received responses.

2. The method as claimed in claim 1, wherein the generating is based on at least one of the payloads of the received responses and initial entropy obtained from the shared underlying resources.

3. The method as claimed in claim 1, comprising storing, for each sent entropy request, the respective timestamp inserted therein.

4. The method as claimed in claim 1, comprising, upon receiving a response from each of the one or more servers, verifying a signature of each response using a respective public key of the one or more servers.

5. The method as claimed in claim 1, comprising discarding decrypted packets for which the comparing of the verifying reveals a difference between the timestamp in the decrypted packet and the corresponding stored timestamp.

6. The method as claimed in claim 1, comprising:
   creating a public-private key pair based on the generated operating entropy;
   setting up a secure connection to one or more entropy providing servers;
   receiving entropy from the one or more entropy providing servers over the secure connection; and
   generating further operating entropy based on one or more of: the received entropy from the one or more entropy providing servers and initial entropy obtained from the shared underlying resources.

7. The method as claimed in claim 1, wherein the generating comprises performing computationally time consuming operations for mangling of verified responses received from the one or more servers and initial entropy obtained from the shared underlying resources.

8. The method as claimed in claim 1, wherein the sending of the respective entropy requests are performed in parallel.

9. The method as claimed in claim 1, wherein each response from the one or more servers comprises the respective time stamp concatenated with the respective entropy bytes, the concatenation being signed and/or encrypted with a respective private key of the one or more servers.

10. A non-transitory computer-readable medium storing a computer program that, when executed by processing circuitry of a cloud computing entity running on shared underlying resources, causes the cloud computing entity to generate operating entropy, by configuring the cloud computing entity to:
    send a respective entropy request to one or more servers, inserting in each entropy request a respective timestamp;
    receive a response from each of the one or more servers, each response payload comprising random bytes of unknown amount of entropy;
    verify validity of each response by comparing the respective timestamp in each response to a corresponding stored timestamp; and
    generate the operating entropy based on at least one of the received responses.

11. A cloud computing entity for generating operating entropy, the cloud computing entity being run on shared underlying resources and configured to:
    send a respective entropy request to one or more servers, inserting in each entropy request a respective timestamp;
    receive a response from each of the one or more servers, each response payload comprising random bytes of unknown amount of entropy;
    verify validity of each response by comparing the respective timestamp in each response to a corresponding stored timestamp; and
    generate the operating entropy based on at least one of the received responses.

* * * * *